United States Patent
Skinner et al.

(10) Patent No.: US 9,014,637 B1
(45) Date of Patent: Apr. 21, 2015

(54) DYNAMIC SWITCHING FREQUENCY CONTROL OF AN ON-CHIP OR INTEGRATED VOLTAGE REGULATOR

(71) Applicant: Intel Corporation, Santa Clara, CA (US)

(72) Inventors: Harry G. Skinner, Beaverton, OR (US); Dawson W. Kesling, Davis, CA (US); Jeremy Shrall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/040,244

(22) Filed: Sep. 27, 2013

(51) Int. Cl.
  *H04B 1/00* (2006.01)
  *H04B 15/00* (2006.01)
  *H04W 52/24* (2009.01)

(52) U.S. Cl.
  CPC .................................. *H04W 52/241* (2013.01)

(58) Field of Classification Search
  USPC ............... 455/63.1, 57.11, 67.13, 572, 114.1, 455/114.2, 296, 343.1, 343.4
  See application file for complete search history.

(56) References Cited

U.S. PATENT DOCUMENTS

| | | | |
|---|---|---|---|
| 6,204,649 B1 * | 3/2001 | Roman .......................... | 323/282 |
| 6,438,462 B1 * | 8/2002 | Hanf et al. .................... | 700/297 |
| 7,362,191 B2 * | 4/2008 | Chen et al. ..................... | 331/78 |
| 7,782,036 B1 * | 8/2010 | Wong et al. .................... | 323/282 |
| 7,805,170 B2 * | 9/2010 | Vishakhadatta .............. | 455/574 |
| 8,169,205 B2 * | 5/2012 | Chen et al. .................... | 323/282 |
| 8,294,445 B2 * | 10/2012 | Kwok ........................... | 323/283 |
| 8,362,649 B2 * | 1/2013 | Fisher et al. ................... | 307/86 |
| 2005/0032493 A1 * | 2/2005 | Sugiyama et al. .......... | 455/168.1 |
| 2006/0072350 A1 * | 4/2006 | Mitrosky et al. ............... | 363/39 |
| 2006/0158163 A1 * | 7/2006 | Machesney ................... | 323/246 |
| 2008/0119140 A1 * | 5/2008 | Maligeorgos et al. ..... | 455/67.13 |
| 2011/0034132 A1 * | 2/2011 | Babitch .......................... | 455/76 |
| 2011/0309679 A1 * | 12/2011 | Fisher et al. ................... | 307/33 |

* cited by examiner

*Primary Examiner* — Tuan A Tran
(74) *Attorney, Agent, or Firm* — Kacvinsky Daisak Bluni PLLC

(57) ABSTRACT

Examples are disclosed for switching frequency control of an on-chip or integrated voltage regulator. In some examples, a switch frequency of an integrated voltage regulator may be monitored. A determination of whether the monitored switch frequency causes radio signal interference may cause the switch frequency to be adjusted to eliminate or reduce the radio signal interference. Other examples are described and claimed.

19 Claims, 7 Drawing Sheets

| Reg. 1 | Reg. 2 | Reg. 3 | Reg. 4 | Reg. 5 | Reg. 6 | Reg. 7 | Reg. 8 | Reg. 9 | Reg. n |
|---|---|---|---|---|---|---|---|---|---|
| Adjust Indicator Bit | Bit 0 | Bit 1 | Bit 2 | Bit 3 | Bit 4 | Bit 5 | Bit 6 | Bit 7 | Bit m |

Register 113

FIG. 2

Storage Medium 600

*Computer Executable Instructions for 500*

*FIG. 6*

DYNAMIC SWITCHING FREQUENCY CONTROL OF AN ON-CHIP OR INTEGRATED VOLTAGE REGULATOR

TECHNICAL FIELD

Examples described herein are generally related to on-chip or integrated voltage regulators.

BACKGROUND

System or input/output (TO) clock harmonics may be sources of interference with wireless components such as radio frequency receivers that may reside within a same computing platform or proximate to one or more components residing on the computing platform. These potential sources of interference may often be predictable and consistent. As a result of being predictable and consistent, system operating parameters may be set to reduce or eliminate potential interference.

Switching voltage regulators that traditionally regulate power to one or more components on a computing platform may have low switching frequencies (e.g., less than one megahertz (MHz)). These low switching frequencies typically cause little to no interference for radio frequency receivers. Also, these types of traditional switching voltage regulators are typically stand-alone or separate from such components as a microprocessor or systems-on-a-chip having several components including a microprocessor. That separation may have further reduced possible interference to radio frequency receivers.

BRIEF DESCRIPTION OF THE DRAWINGS

FIG. 2 illustrates an example register.
FIG. 6 illustrates an example of a storage medium.

DETAILED DESCRIPTION

As contemplated in the present disclosure, switching voltage regulators that traditionally regulate power to one or more components on the computing platform may have low switching frequencies. Also, these types of voltage regulators may be separate from or off-chip in relation to components for which voltage was being regulated. However, recent efforts have been made to integrate or move voltage regulators on-chip. These on-chip or integrated voltage regulators (IVRs) may be in close proximity to components served and may have switching frequencies of around 100 MHz.

IVR switching frequencies of around 100 MHz may be a significant source of interference for wireless components arranged to receive radio signals. Possible harmonics caused by these relatively high IVR switching frequencies could be problematic. Spread spectrum electromagnetic interference (EMI) techniques may reduce interference noise for these IVRs to pass country-specific electromagnetic compatibility (EMC) requirements. But spread spectrum EMI techniques may not reduce noise interference sufficiently enough for wireless components that may be in close proximity to a given IVR on a single chip.

Adaptive clocking technology (ACT) may be used to possibly adjust/move possible interfering frequencies to avoid interference with wireless components. However, IVRs having high switching frequencies tend to change switching frequency on a dynamic basis due to load conditions and/or thermal drift. A changing IVR switching frequency makes ACT problematic in that ACT assumes a static frequency that may not change as frequently an IVR with a relatively high switching frequency. It is with respect to these and other challenges that the examples described herein are needed.

In some examples, techniques are implemented for dynamic switching frequency control of an on-chip or integrated voltage regulator. For these examples, the techniques may include monitoring a switching frequency for an IVR. Radio frequency information may be received on a periodic basis. The radio frequency information may be for one or more operating wireless components co-located on-chip with the IVR or proximate to the IVR (e.g., located off-chip). A determination may be made as to whether the monitored switching frequency causes radio signal interference to the one or more wireless components based on the radio frequency information. An adjustment to the switching frequency may then be made based on the determination.

Figure 1:
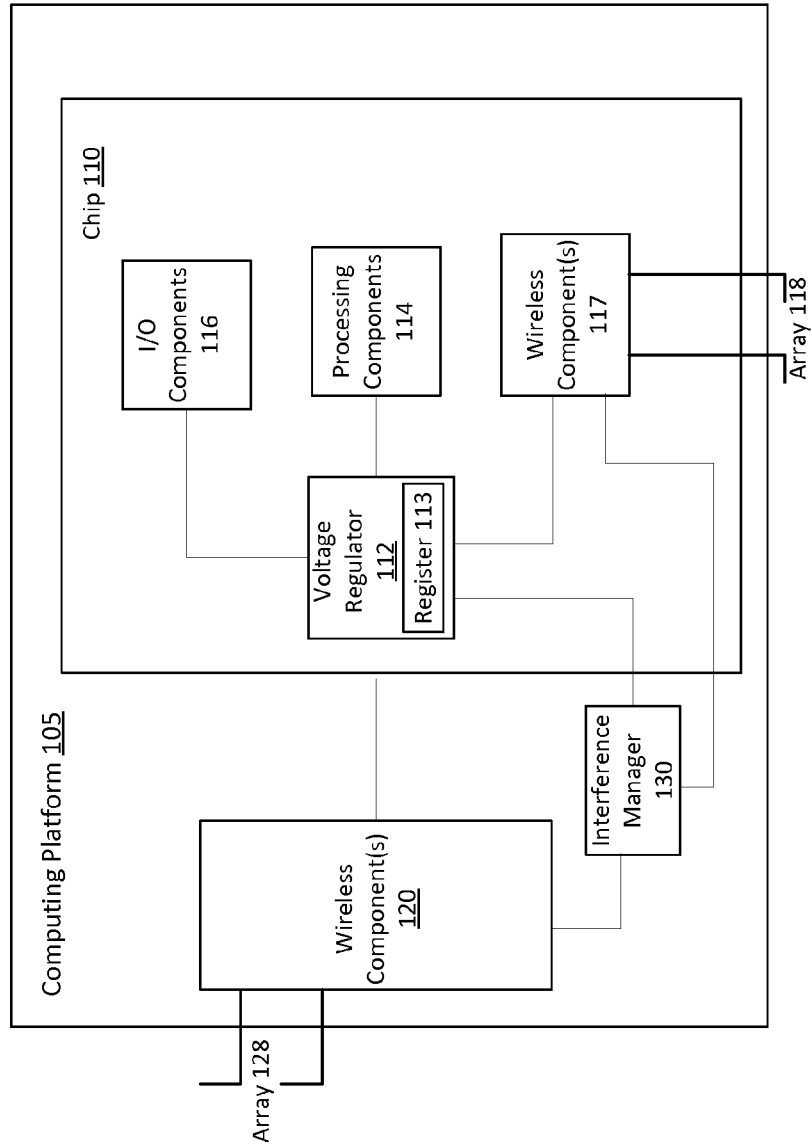
FIG. 1 illustrates an example of a system.

FIG. 1 illustrates an example system 100. In some examples, as shown in FIG. 1, system 100 includes a computing platform 105 having a chip 110, wireless component(s) 120 or an interference manager 130. As shown in FIG. 1, chip 110 may include a voltage regulator 112, processing components 114, I/O components 116, or one or more wireless component(s) 117. According to some examples, as shown in FIG. 1, wireless component(s) 117 and wireless components 120 may have arrays 118 and 128, respectively.

In some examples, as shown in FIG. 1, voltage regulator 112 may be located on chip 110 and may be referred to as an on-chip or integrated voltage regulator (IVR). Voltage regulator 112 may be a switching type voltage regulator capable of operating at switching frequencies of 50 MHz or greater. For example, voltage regulator 112 may be configured to operate with an adjustable switching frequency from 90 MHz to as high as 160 MHz. Switching frequencies above 90 MHZ may allow for greater responsiveness (e.g., less ripple effects) but efficiency of the voltage regulator may reach unacceptable levels at switching frequencies above 160 MHz.

According to some examples, voltage regulator 112 may regulate operating voltages for processor components 114. Processor components 114 may include one or more processing elements such as, but not limited to, multi-core processors, central processing units (CPUs) or microprocessors. Processor components 114 may also include an integrated memory controller and/or an integrated graphics processing unit (GPU). For these examples, having a voltage regulator 112 on-chip that operates at a relatively high switching frequency may allow for rapid transitions in and out of various power state modes for processor components 114. Rapid transitions may allow for a substantial power saving potential and yet still maintain high performance levels for processor components 114.

In some examples, voltage regulator 112 may also regulate operating voltages for one or more wireless component(s) 117. Wireless component(s) 117 may include various radio frequency (RF) elements (e.g., transceivers) to enable wireless communications for chip 110 and/or computing platform 105. These RF elements included in wireless component(s) 117 may utilize array 118. Array 118 may include a plurality of antennas to transmit or receive radio frequency signals.

According to some examples, wireless component(s) 120 may also include various RF elements to provide additional wireless communication capabilities for chip 110 and/or computing platform 105. These RF elements may utilize array 128 that may include a plurality of antennas to transmit or receive radio frequency signals.

Although FIG. 1 shows both on-chip and off-chip wireless components. Other examples are contemplated where chip 110 does not include wireless component(s) 117. For these other examples, wireless component(s) 120 may enable wireless communication capabilities for computing platform 105 and/or chip 110. Alternatively, computing platform 105 may not have a separate wireless component(s) 120 and on-chip wireless component(s) 117 may enable wireless communications.

As mentioned above, possible harmonics caused by an IVR operating at around 100 MHz may cause substantial interference for wireless components arranged to receive radio signals. The wireless components possibly affected may include co-located wireless component(s) 117 or proximately located wireless component(s) 120. Also, as mentioned above, changing load conditions and/or thermal drift may cause switching frequencies for an IVR such as voltage regulator 112 to fluctuate or change (e.g., due to thermal drift). As described more below interference manager 130 may include logic and/or features capable of dynamically adjusting switching frequencies to accommodate for fluctuations in IVR switching frequency and minimize or reduce radio signal interference to co-located and/or proximate wireless component(s).

According to some examples, interference manager 130 may include logic and/or features capable of monitoring a switching frequency for voltage regulator 112. Interference manager 130 may also include logic and/or features capable of receiving radio frequency information for wireless component(s) 120 and/or wireless component(s) 117. The radio frequency information may include what radio frequencies are currently being used to receive radio signals through respective arrays 128 and 118. Interference manager 130 may also include logic and/or features capable of determining whether the monitored switching frequency for voltage regulator 112 causes radio signal interference to wireless component(s) 120 and/or wireless component(s) 117 based on the radio frequency information. Interference manager 130 may further include logic and/or features to adjust the switching frequency of voltage regulator 112 based on the determination of whether radio signal interference may be caused.

In some examples, as shown in FIG. 1, voltage regulator 112 includes a register 113. Register 113 may be arranged to maintain a plurality of binary bits. Register 113 may include selectively asserted registers to indicate the binary bits that may be capable of enabling logic and/or features of interference manager 130 to program and/or incrementally adjust the switching frequency for voltage regulator 112 based on the determination of whether radio signal interference may be caused by the monitored switching frequency.

According to some examples, interference manager 130 may be located on chip 110. For these examples, processor components 114 may include processing elements to support or implement instances of interference manager 130. In some other examples, interference manager 130 may be incorporated within a chipset (not shown) for computing platform 105 that may support operations for chip 110, wireless component(s) 120 or other components of computing platform 105.

In some examples, computing platform 105 may be for any electronic device that may include but is not limited to, a computer, a personal computer (PC), a desktop computer, a laptop computer, a notebook computer, a netbook computer, a tablet computer, an ultra-book computer, a smart phone, a smart camera, embedded electronics, a smart watch, a gaming console, a portable media device, a portable gaming device, a wearable computing device, a work station, a mini-computer, a network appliance or a web appliance.

FIG. 2 illustrates an example register 113. According to some examples, as shown in FIG. 2, register 113 may be arranged to maintain binary bits 0 to m via use of registers 2 to n. For these examples, "m" may represent any whole integer greater than 7 and "n" may represent any whole integer greater than 9. Register 113 may also be arranged to maintain a binary bit in register 1 that is shown in FIG. 2 as an adjust indicator bit. Although the adjust indicator bit is indicated in FIG. 2 as being in the first bit of registers 1 to n, the adjust indicator bit may be located in other register locations for the registers included in register 113 (e.g., register 9).

In some examples, logic and/or features of interference manager 130 may selectively assert one or more bits 0 to m to program or adjust a switching frequency for voltage regulator 112. For these examples, on-chip voltage regulator 112 may be designed to operate within a range of 90 MHz to 154 MHz and register 113 may maintain an 8-bit binary value in registers 2 to 9 to enable the logic and/or features of interference manager 130 to set an initial switching frequency or adjust a monitored switching frequency of voltage regulator 112. For example, a total of 256 different binary values may be indicated by selectively asserting (e.g., storing a value of "1") separate registers from among registers 2 to 9. A binary value of 00000000 may enable the logic and/or features of interference manager 130 to program or adjust the switching frequency for voltage regulator 112 to 90 MHz. According to this example, each increment of the 8-bit binary value may then correspond to 0.25 MHz with a maximum binary value of 11111111 corresponding to 154 MHz.

According to some examples, adjust indicator bit maintained by register 1 may be asserted by interference manager 130 each time the switching frequency for voltage regulator 112 is programmed or adjusted. Logic and/or features located at or controlling voltage regulator 113 may monitor register 1. Responsive to register 1 being asserted, the logic and/or features at or controlling voltage regulator 113 may read the binary bit values maintained in registers 2 to n and cause the switching frequency for voltage regulator 113 to be set accordingly and then de-assert register 1 to indicate completion of the adjustment. In some examples, the logic and/or features at or controlling voltage regulator 113 may also cause the switching frequency to be set to meet one or more country-specific EMC requirements via spread spectrum clocking.

Figure 3:
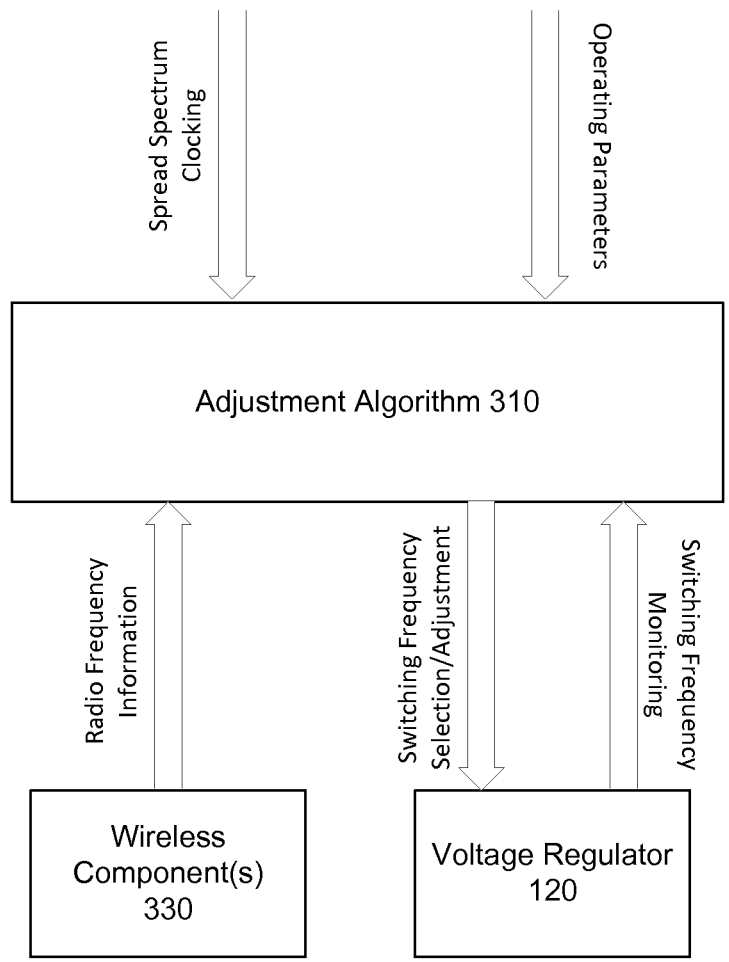
FIG. 3 illustrates an example process.

FIG. 3 illustrates an example process 300. In some examples, as shown in FIG. 3, process 300 depicts a flow of information to an adjustment algorithm 310 resulting in selection/adjustment to a switching frequency for voltage regulator 320. For these examples, the flow of information may include radio frequency information from one or more wireless components 330, switching frequency monitoring of voltage regulator 320, operating parameters, or spread spectrum clocking.

According to some examples, spread spectrum clocking information inputted to adjustment algorithm 310 may indicate what spread spectrum clocking technique is being implemented to meet country-specific EMC requirements for the switching frequency set for voltage regulator 320. Also, operating parameters may indicate a range of switching frequencies for voltage regulator 320 that are optimal for regulating power to components. For example, a range of 90 MHz to 154 MHz may be an optimal switching frequency range for voltage regulator 320 to regulator power to co-located components such as a microprocessor. Operating parameters may also include information to indicate possible radio signal interference associated with one or more switching frequencies within the range of switching frequencies. For example, wireless component(s) 330 may be capable of receiving radio signals at various radio signal frequencies. The operating parameter information may indicate the one or more switching frequencies that may likely cause radio signal interference with the various radio signal frequencies.

In some examples, radio frequency information to adjustment algorithm 310 may include information to indicate what radio signal frequencies wireless component(s) 330 may be using to receive radio signals. Also, switching frequency monitoring information to adjustment algorithm 310 may indicate what monitored switching frequency voltage regulator 320 may be operating at. The monitored switching frequency, for example, may be within a range of 90 MHz to 154 MHz.

According to some examples, logic and/or features (e.g., at an interference manager such as interference manager 130) may be arranged to cause selection/adjustment to the switching frequency of voltage regulator 320. For these examples, the logic and/or features may use the information inputted to adjustment algorithm 310 to periodically determine what selection/adjustment to the switching frequency of voltage regulator 320 may be needed to reduce or eliminate possible radio signal interference to wireless component(s) 330. Voltage regulator 320 may be similar to voltage regulator 112 and thus may be an IVR possibly co-located with wireless component(s) 330 on a same chip or located proximate to wireless component(s) 330.

Figure 4:
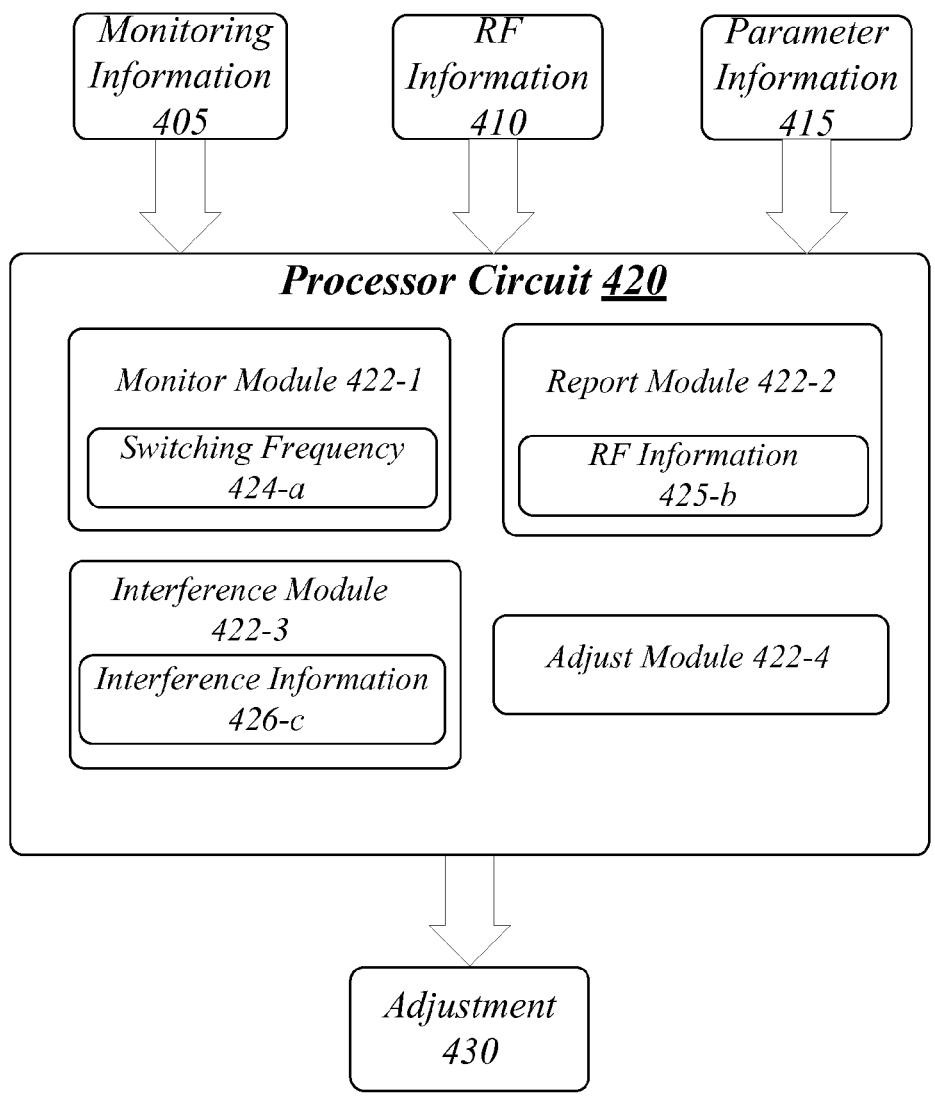
FIG. 4 illustrates an example block diagram for an apparatus.

FIG. 4 illustrates a block diagram for an example first apparatus. As shown in FIG. 4, the example first apparatus includes apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may comprise a computer-implemented apparatus 400 having a processor circuit 420 arranged to execute one or more software modules 422-a. It is worthy to note that "a" and "b" and "c" and similar designators as used herein are intended to be variables representing any positive integer. Thus, for example, if an implementation sets a value for a=4, then a complete set of software modules 422-a may include modules 422-1, 422-2, 422-3 and 422-4. The examples are not limited in this context.

According to some examples, apparatus 400 may be incorporated within a component for a computing platform (e.g., computing platform 105) such as an interference manager that may be arranged to cause adjustments to a switching frequency for an on-chip or integrated voltage regulator.

In some examples, as shown in FIG. 4, apparatus 400 includes processor circuit 420. Processor circuit 420 may be generally arranged to execute one or more software modules 422-a. The processing circuit 420 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 420. According to some examples, processor circuit 420 may also be an application specific integrated circuit (ASIC) and at least some modules 422-a may be implemented as hardware elements of the ASIC.

According to some examples, apparatus 400 may include a monitor module 422-1. Monitor module 422-1 may be executed by processor circuit 420 to monitor an IVR switching frequency for an IVR capable of regulating voltage for a one or more components possibly collocated with the IVR such as, but not limited to, a CPU, a GPU or a memory controller for the CPU and/or the GPU. In some examples, monitoring information 405 may include the monitored IVR switching frequency. Monitor module 422-1 may maintain switch frequency 424-a in a data structure such as a lookup table (LUT) to at least temporarily store the monitored IVR switch frequency.

In some examples, apparatus 400 may also include a report module 422-2. Report module 422-2 may be executed by processor circuit 420 to receive radio frequency information for one or more wireless components co-located on-chip with the IVR being monitored or proximate to the IVR. For these examples, RF information 410 may include the radio frequency information. Also, report module 422-2 may at least temporarily maintain (e.g., in a LUT) the received radio frequency information with RF information 425-b.

In some examples, apparatus 400 may also include an interference module 422-3. Interference module 422-3 may be executed by processor circuit 420 to determine whether the monitored IVR switching frequency causes radio signal interference to the one or more operating wireless components based on the radio frequency information. For these examples, interference module 422-3 may obtain the IVR switching frequency and radio frequency information from monitor module 422-1 and report module 422-2, respectively and also interference information from interference information 426-c (e.g., maintained in a LUT) to make the determination of whether radio signal interference may occur. Interference information 426-c, may include spread spectrum clocking information, IVR switching frequency ranges or one or more switching frequencies predetermined to possibly interfere with one or more radio frequencies in use by the operating wireless components.

According to some examples, apparatus 400 may also include an adjust module 422-4. Adjust module 422-4 may be executed by processor circuit 420 to adjust the IVR switching frequency based on the determination made by interference module 422-3. For these examples, adjust module 422-4 may cause adjustment 430 that may include causing a selective assertion of one or more bits maintained by a register that may control IVR switching frequencies.

Various modules of apparatus 400 and a device implementing apparatus 400 may be communicatively coupled to each other by various types of communications media to coordinate operations. The coordination may involve the uni-directional or bi-directional exchange of information. For instance, the modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
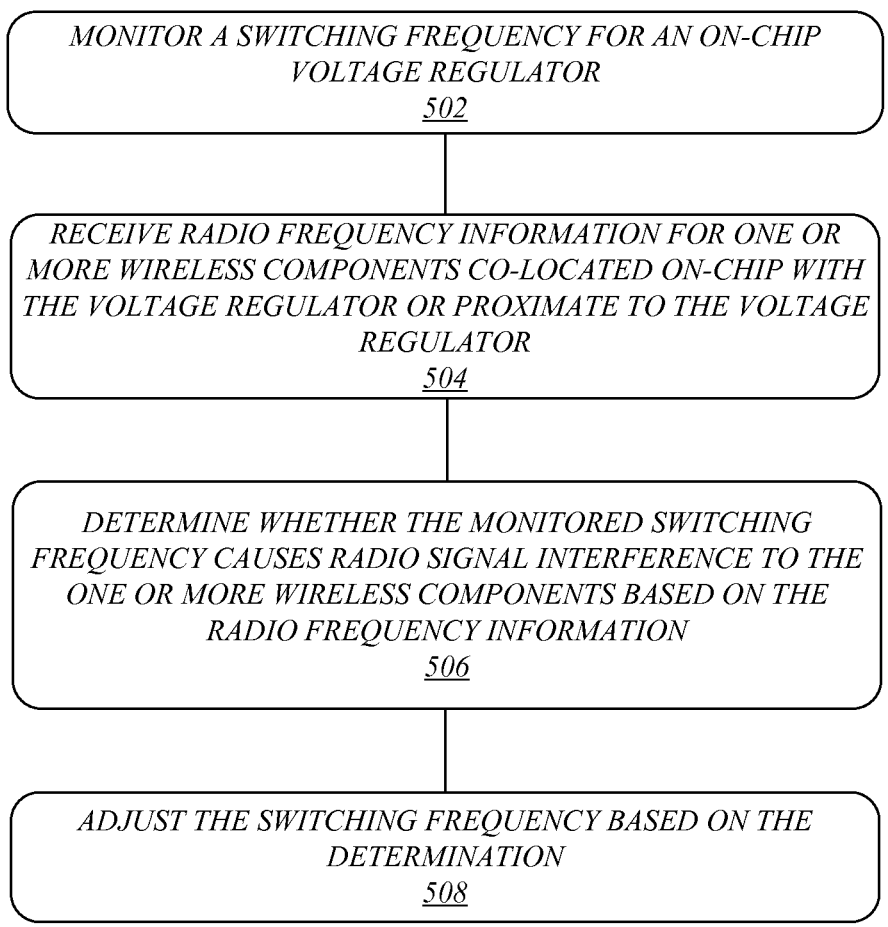
FIG. 5 illustrates an example of a logic flow.

FIG. 5 illustrates an example of a logic flow 500. Logic flow 500 may be representative of some or all of the operations executed by one or more logic, features, or devices described herein, such as apparatus 400. More particularly, logic flow 500 may be implemented by monitor module 422-1, report module 422-2, interference module 422-3 or adjust module 422-4.

In the illustrated example shown in FIG. 5, logic flow 500 at block 502 may monitor a switching frequency for an on-chip voltage regulator. For these examples, the on-chip voltage regulator may include an IVR and the IVR switching frequency may be monitored by monitor module 422-1.

According to some examples, logic flow 500 at block 504 may receive radio frequency information for one or more wireless components co-located with the voltage regulator or proximate to the voltage regulator. For these examples, report module 422-2 may receive the radio frequency information.

In some examples, logic flow 500 at block 506 may determine whether the monitored switching frequency causes radio signal interference to the one or more wireless components based on the radio frequency information. For these examples, interference module 422-3 may make the determination.

According to some examples, logic flow 500 at block 508 may adjust the switching frequency based on the determination. For these examples, adjust module 422-4 may cause the adjustment to the IVR switching frequency based on the determination made by interference module 422-3.

FIG. 6 illustrates an embodiment of a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
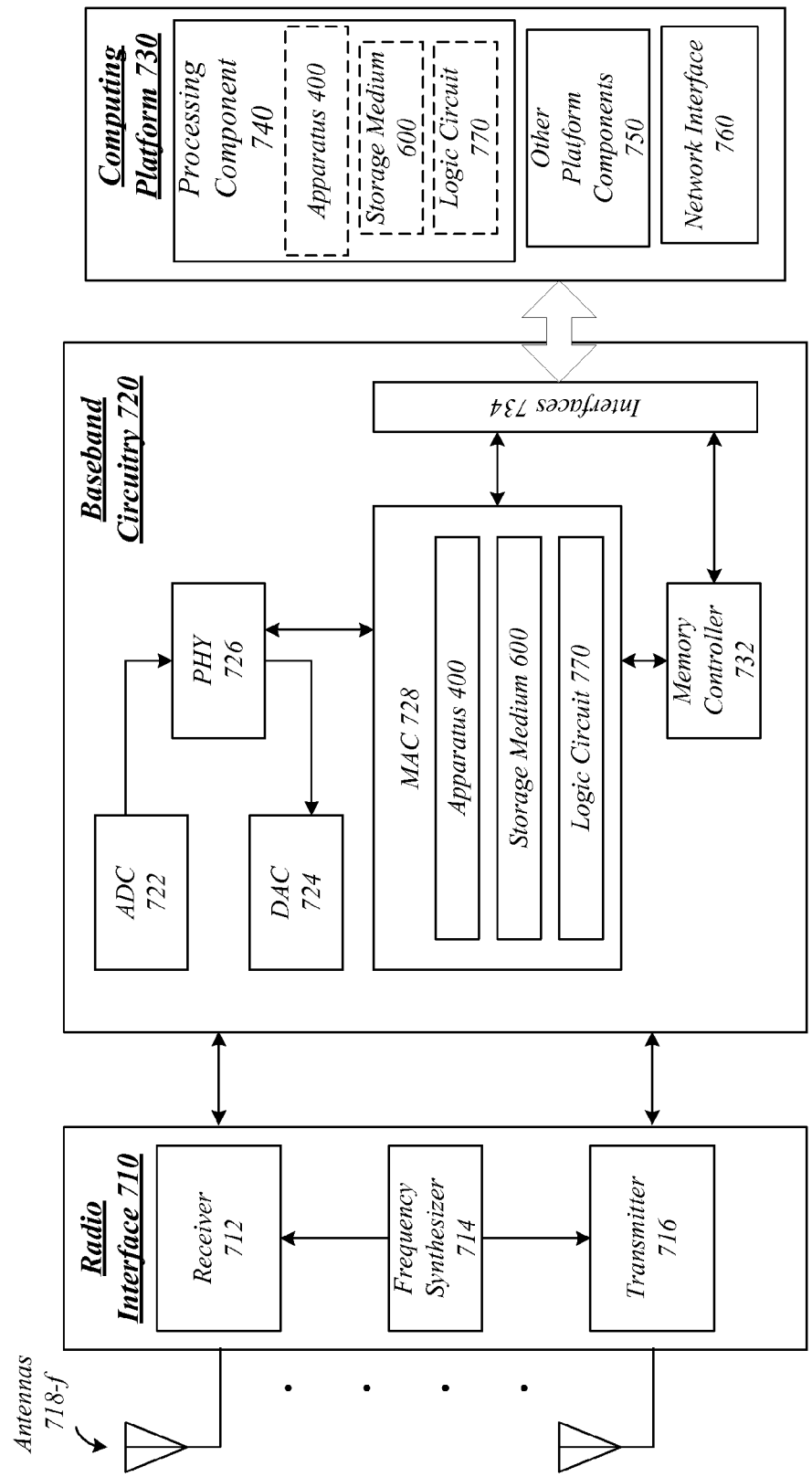
FIG. 7 illustrates an example of a device.

FIG. 7 illustrates an embodiment of a device 700 for use in a broadband wireless access network. Device 700 may implement, for example, apparatus 400, storage medium 600 and/or a logic circuit 770. The logic circuit 770 may include physical circuits to perform operations described for apparatus 400. As shown in FIG. 7, device 700 may include a radio interface 710, baseband circuitry 720, and computing platform 730, although examples are not limited to this configuration.

The device 700 may implement some or all of the structure and/or operations for the apparatus 400, storage medium 600 and/or logic circuit 770 in a single computing entity, such as entirely within a single device. Alternatively, the device 700 may distribute portions of the structure and/or operations for apparatus 400, storage medium 600 and/or logic circuit 770 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-$f$. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with MAC processing circuit 728 and/or a computing platform 730, for example, via one or more interfaces 734.

In some examples, PHY processing circuit 726 may include a frame construction and/or detection module, in combination with additional circuitry such as a buffer memory, to construct and/or deconstruct communication frames (e.g., containing subframes). Alternatively or in addition, MAC processing circuit 728 may share processing for certain of these functions or perform these processes independent of PHY processing circuit 726. In some embodiments, MAC and PHY processing may be integrated into a single circuit.

Computing platform 730 may provide computing functionality for device 700. As shown, computing platform 730 may include a processing component 740. In addition to, or alternatively of, baseband circuitry 720 of device 700 may execute processing operations or logic for apparatus 400, storage medium 6, and logic circuit 770 using the processing component 730. Processing component 740 (and/or PHY 726 and/or MAC 728) may comprise various hardware elements, software elements, or a combination of both. Examples of hardware elements may include devices, logic devices, components, processors, microprocessors, circuits, processor circuits (e.g., processor circuit 420), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

According to some examples, radio interface 710 and baseband circuitry 720 may be integrated with at least some elements of computing platform 730. For these examples, at least some elements of radio interface 710 and baseband circuitry 720 may be part of a system on a chip.

Computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, integrated voltage regulators (IVRs) and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 730 may further include a network interface 760. In some examples, network interface 760 may include logic and/or features to support various wired or wireless communication standards. In some other examples, network interface 760 may include logic and/or features to for a wireless device/component having a communication interface configured incompliance with one or more wired or wireless communication standards.

Wireless communication standards may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

Also, by way of example and not limitation, network interface 760 may operating in compliance with various 3GPP LTE and LTE-A standards, such as the 3GPP LTE Evolved UMTS Terrestrial Radio Access Network (E-UTRAN), Universal Terrestrial Radio Access (E-UTRA) and LTE-A Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

Device 700 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 700 described herein, may be included or omitted in various embodiments of device 700, as suitably desired. In some embodiments, device 700 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 700 may be implemented using single input single output (SISO) architectures. However, certain implementations may include multiple antennas (e.g., antennas 718-*f*) for transmission and/or reception using adaptive antenna techniques for beamforming or spatial division multiple access (SDMA) and/or using multiple input multiple output (MIMO) communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, an example apparatus may include a processor circuit. For these examples, the apparatus may also include a monitor module to be executed by the processor circuit to monitor an IVR switching frequency for an IVR capable of regulating voltage for a microprocessor co-located on-chip with the IVR. The apparatus may also include a report module to be executed by the processor circuit to receive radio frequency information for one or more wireless components co-located on-chip with the IVR or proximate to the IVR. The apparatus may also include an interference module to be executed by the processor circuit to determine whether the monitored IVR switching frequency causes radio signal interference to the one or more wireless components based on the radio frequency information. The apparatus may also include an adjust module to be executed by the processor circuit to adjust the IVR switching frequency based on the determination of the interference module.

According to some examples for the apparatus, the adjust module may adjust the IVR switching frequency via a register arranged to control the IVR. The register may maintain a plurality of binary bits that are capable of incrementally adjusting the IVR switching frequency.

In some examples for the apparatus, the adjust module may indicate in at least one of the plurality of bits whether an adjustment was made to the IVR switching frequency.

According to some examples for the apparatus, the IVR switching frequency may have a range of 90 megahertz (MHz) to 154 MHz and the register may maintain an 8-bit value to enable the adjust module to cause an adjustment to the IVR switching frequency of at least 0.25 MHz increments within the range of 90 MHz to 154 MHz.

In some examples for the apparatus, the IVR switching frequency may be arranged to meet one or more country-specific EMC requirements via use of spread spectrum clocking.

According to some examples for the apparatus, the interference module may determine whether the monitored IVR switching frequency causes radio signal interference based on comparing the monitored IVR switching frequency to a range of IVR switching frequencies predetermined to be interference free for one or more receiving radio signal frequencies indicated in the radio frequency information.

In some examples for the apparatus, a digital display may be coupled to the processor circuit to present a user interface view.

In some examples, an example computer-implemented method may include monitoring a switching frequency for an on-chip voltage regulator. The computer-implemented method may also include receiving radio frequency information for one or more wireless components co-located on-chip with the voltage regulator or proximate to the voltage regulator. The computer-implemented method may also include determining whether the monitored switching frequency causes radio signal interference to the one or more wireless components based on the radio frequency information. The computer-implemented method may also include adjusting the switching frequency based on the determination.

According to some examples for the computer-implemented method, the voltage regulator switching frequency may be arranged to meet one or more country-specific EMC requirements via use of spread spectrum clocking.

In some examples for the computer-implemented method, determining may be based on comparing the monitored switching frequency to a range of switching frequencies predetermined to be interference free for one or more receiving radio signal frequencies indicated in the received radio frequency information.

According to some examples for the computer-implemented method, the on-chip voltage regulator may be capable of operating at a switching frequency of 50 megahertz (MHz) or greater.

In some examples for the computer-implemented method, the on-chip voltage regulator may be capable of regulating voltage for a microprocessor co-located on-chip with the voltage regulator.

According to some examples for the computer-implemented method, at least one machine readable medium may include a plurality of instructions that in response to being executed on a computing device may cause the computing device to carry out any of the above mentioned implementations of the computer-implemented method.

In some examples for the computer-implemented method, an apparatus may include means for performing any of the above mentioned implementations of the computer-implemented method.

In some examples, an example at least one machine readable medium may include a plurality of instructions that in response to being executed on a system causes the system to monitor an IVR switching frequency for an IVR capable of regulating voltage for one or more on-chip components. The instructions may also cause the system to receive radio frequency information for one or more wireless components co-located on-chip with the IVR or proximate to the IVR. The instructions may also cause the system to determine whether the monitored IVR switching frequency causes radio signal interference to the one or more wireless components based on the radio frequency information. The instructions may also cause the system to adjust the IVR switching frequency based on the determination.

According to some examples for the at least one machine readable medium, the instructions to further cause the system to adjust the IVR switching frequency via a register arranged to control the IVR, the register to maintain a plurality of binary bits that are capable of incrementally adjusting the IVR switching frequency.

In some examples for the at least one machine readable medium, at least one of the plurality of bits may be capable of indicating whether an adjustment was made to the IVR switching frequency.

According to some examples for the at least one machine readable medium, the IVR may be capable of having operating switching frequencies of 50 megahertz (MHz) or greater.

In some examples for the at least one machine readable medium, the IVR switching frequency may be arranged to meet one or more country-specific EMC requirements via use of spread spectrum clocking.

In some examples for the at least one machine readable medium, to determine whether the monitored IVR switching frequency causes radio signal interference may be based on a comparison of the monitored IVR switching frequency to a range of IVR switching frequencies predetermined to be interference free for one or more receiving radio signal frequencies indicated in the received radio frequency information.

According to some examples for the at least one machine readable medium, the one or more on-chip components may include a microprocessor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a processor circuit;
   a monitor module to be executed by the processor circuit to monitor an integrated voltage regulator (IVR) switching frequency for an IVR capable of regulating voltage for a microprocessor co-located on-chip with the IVR;
   a report module to be executed by the processor circuit to receive radio frequency information for one or more wireless components co-located on-chip with the IVR or proximate to the IVR;
   an interference module to be executed by the processor circuit to determine whether the monitored IVR switching frequency causes radio signal interference to the one or more wireless components based on the radio frequency information; and
   an adjust module to be executed by the processor circuit to adjust the IVR switching frequency based on the determination of the interference module.

2. The apparatus of claim 1, comprising the adjust module to adjust the IVR switching frequency via a register arranged to control the IVR, the register to maintain a plurality of binary bits that are capable of incrementally adjusting the IVR switching frequency.

3. The apparatus of claim 2, comprising the adjust module to indicate in at least one of the plurality of bits whether an adjustment was made to the IVR switching frequency.

4. The apparatus of claim 2, comprising the IVR switching frequency having a range of 90 megahertz (MHz) to 154 MHz and the register maintaining an 8-bit value to enable the adjust module to cause an adjustment to the IVR switching frequency of at least 0.25 MHz increments within the range of 90 MHz to 154 MHz.

5. The apparatus of claim 1, comprising the IVR switching frequency arranged to meet one or more country-specific electromagnetic compatibility (EMC) requirements via use of spread spectrum clocking.

6. The apparatus of claim 1, comprising the interference module to determine whether the monitored IVR switching frequency causes radio signal interference based on comparing the monitored IVR switching frequency to a range of IVR switching frequencies predetermined to be interference free for one or more receiving radio signal frequencies indicated in the radio frequency information.

7. The apparatus of claim 1, comprising a digital display coupled to the processor circuit to present a user interface view.

8. A computer-implemented method comprising:
   monitoring a switching frequency for an on-chip voltage regulator;
   receiving radio frequency information for one or more wireless components co-located on-chip with the voltage regulator or proximate to the voltage regulator;
   determining whether the monitored switching frequency causes radio signal interference to the one or more wireless components based on the radio frequency information; and
   adjusting the switching frequency based on the determination.

9. The computer-implemented method of claim 8, comprising the voltage regulator switching frequency arranged to meet one or more country-specific electromagnetic compatibility (EMC) requirements via use of spread spectrum clocking.

10. The computer-implemented method of claim 8, comprising determining based on comparing the monitored switching frequency to a range of switching frequencies predetermined to be interference free for one or more receiving radio signal frequencies indicated in the received radio frequency information.

11. The computer-implemented method of claim 8, comprising the on-chip voltage regulator capable of operating at a switching frequency of 50 megahertz (MHz) or greater.

12. The computer-implemented method of claim 8, comprising the on-chip voltage regulator capable of regulating voltage for a microprocessor co-located on-chip with the voltage regulator.

13. At least one machine readable medium comprising a plurality of instructions that in response to being executed on a system causes the system to:
    monitor an integrated voltage regulator (IVR) switching frequency for an IVR capable of regulating voltage for one or more on-chip components;
    receive radio frequency information for one or more wireless components co-located on-chip with the IVR or proximate to the IVR;
    determine whether the monitored IVR switching frequency causes radio signal interference to the one or more wireless components based on the radio frequency information; and
    adjust the IVR switching frequency based on the determination.

14. The at least one machine readable medium of claim 13, comprising the instructions to further cause the system to adjust the IVR switching frequency via a register arranged to control the IVR, the register to maintain a plurality of binary bits that are capable of incrementally adjusting the IVR switching frequency.

15. The at least one machine readable medium of claim 13, comprising at least one of the plurality of bits capable of indicating whether an adjustment was made to the IVR switching frequency.

16. The at least one machine readable medium of claim 15, comprising the IVR capable of having operating switching frequencies of 50 megahertz (MHz) or greater.

17. The at least one machine readable medium of claim 13, comprising the IVR switching frequency arranged to meet one or more country-specific electromagnetic compatibility (EMC) requirements via use of spread spectrum clocking.

18. The at least one machine readable medium of claim 13, comprising to determine whether the monitored IVR switching frequency causes radio signal interference is based on a comparison of the monitored IVR switching frequency to a range of IVR switching frequencies predetermined to be interference free for one or more receiving radio signal frequencies indicated in the received radio frequency information.

19. The at least one machine readable medium of claim 13, comprising the one or more on-chip components including a microprocessor.

* * * * *